US007346672B2

(12) United States Patent
Harvey, IV

(10) Patent No.: US 7,346,672 B2
(45) Date of Patent: Mar. 18, 2008

(54) AUTOMATIC TFTP FIRMWARE DOWNLOAD

(75) Inventor: Arthur Edwin Harvey, IV, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 811 days.

(21) Appl. No.: 10/098,941

(22) Filed: Mar. 12, 2002

(65) Prior Publication Data

US 2003/0177208 A1 Sep. 18, 2003

(51) Int. Cl.
*G06F 15/177* (2006.01)
(52) U.S. Cl. ..................................... 709/221
(58) Field of Classification Search ............... 717/168, 717/172–173; 713/1–2; 709/220–221
See application file for complete search history.

(56) References Cited

U.S. PATENT DOCUMENTS

| | | | |
|---|---|---|---|
| 6,266,809 B1 * | 7/2001 | Craig et al. ................. | 717/173 |
| 6,360,362 B1 * | 3/2002 | Fichtner et al. ............. | 717/168 |
| 6,601,096 B1 * | 7/2003 | Lassiter, Jr. ................. | 709/222 |
| 6,601,212 B1 * | 7/2003 | Guha et al. .................. | 714/776 |
| 6,622,246 B1 * | 9/2003 | Biondi ........................ | 713/100 |
| 6,678,741 B1 * | 1/2004 | Northcutt et al. ........... | 709/248 |
| 6,735,692 B1 * | 5/2004 | Murphrey et al. ............ | 713/1 |
| 6,816,963 B1 * | 11/2004 | Krithivas et al. ............ | 713/1 |
| 6,904,457 B2 * | 6/2005 | Goodman .................... | 709/221 |
| 6,907,602 B2 * | 6/2005 | Tsai et al. .................... | 717/168 |
| 6,934,269 B1 * | 8/2005 | Hasha et al. ................. | 370/312 |
| 6,938,096 B1 * | 8/2005 | Greschler et al. ........... | 709/239 |
| 6,988,193 B2 * | 1/2006 | French et al. ................ | 713/2 |
| 7,139,816 B2 * | 11/2006 | Anand et al. ................ | 709/220 |
| 2003/0031134 A1 * | 2/2003 | Chiu .......................... | 370/252 |

OTHER PUBLICATIONS

Deel, Nelson, Smith, Developing Cisco IP Phone Services: A Cisco AVVID Solution, Feb. 15, 2002, Cisco Press, Chapter 12.*
Matt Butcher, Network Booting a Linux STB with PXE, http://www.linuxdevices.com/files/misc/pxe_boot_stb-howto.html, Dated Jan. 29, 2002 via WayBack machine @ http://www.archive.org.*
Intel, Preboot Execution Environment (PXE) Specification Version 2.1, Sep. 1999.*

* cited by examiner

*Primary Examiner*—Andrew Caldwell
*Assistant Examiner*—Grant Ford

(57) ABSTRACT

A method of performing automatic Trivial File Transfer Protocol (TFTP) firmware download, includes: obtaining, by either a network-connected device (i.e., DHCP) or user (i.e., command file), a configuration file, where the configuration file includes an Internet Protocol (IP) address of a target device and a file name of a target file in the target device; retrieving a software image from the target file; determining if there is a match between the software image from the target file and another software image currently running on the device; and downloading to the network-connected device the software image from the target file if the software image is compatible and different from the software image currently in the device. An apparatus for performing automatic Trivial File Transfer Protocol (TFTP) firmware download, includes: a device including a TFTP module; and a target device coupled to the device via a network, the target device including a TFTP module to permit an automatic TFTP protocol to download a configuration from the target device to the device, where the device obtains a configuration file with an automatic TFTP statement indicating the Internet Protocol (IP) address of the target device and a file name of a target file with the configuration.

53 Claims, 7 Drawing Sheets

AUTOMATIC TFTP FIRMWARE DOWNLOAD

TECHNICAL FIELD

This disclosure relates generally to communication networks, and more particularly to an apparatus and method for automatically downloading firmware to devices in a network.

BACKGROUND

In networks technology, a "segment" is a section of a network that is typically bounded by bridges, routers, or switches. Dividing an Ethernet local area network (LAN) into multiple segments is one of the most common ways of increasing available bandwidth on the LAN. If segmented correctly, most network traffic will remain within a single segment, enjoying the full bandwidth supported by the media. Hubs and switches are typically used to interconnect computers within each segment, and switches can also interconnect multiple segments through the use of VLANs (virtual LANs).

When a switch is added on a network, the switch is typically configured specifically for that network. Firmware is required for the switch to perform its intended function(s). It is desirable that the switch run the most current version of firmware.

A switch may be pre-configured to use the Dynamic Host Configuration Protocol or the Bootstrap Protocol (BOOTP) for obtaining its Internet Protocol (IP) address and configuration profile. DHCP is a Transmission Control Protocol/Internet Protocol (TCP/IP) protocol that enables a network connected to the Internet to assign a temporary IP address to a host automatically when the host connects to the network. Thus, the DHCP protocol permits the central management and automation in assigning IP addresses in the network. Without DHCP, the IP address must be manually entered at each device. The BOOTP protocol also permits an IP address to be automatically assigned to a device that is connected to the network, and permits an operating system boot or initiation of the device.

However, for current technology, the user is required to manually enter the particular address of a target whenever the user wishes to upgrade the firmware. Therefore, current technology is limited in its capabilities to maintain a current version of firmware and suffers from at least the above constraint.

SUMMARY

In accordance with an embodiment of the invention, a method of performing automatic Trivial File Transfer Protocol (TFTP) firmware download, includes: obtaining, by either a networked-connected device (i.e., DHCP) or user (i.e., command line), a configuration file, where the configuration file includes an Internet Protocol (IP) address of a target device and a file name of a target file in the target device; retrieving a software image in the target file; determining if there is a match between the software image from the target file and the software image currently running on the device; and downloading to the networked-connected device the software image from the target file if the software image is compatible and different from the software image currently in the device.

In another embodiment of the invention, a method of performing automatic Trivial File Transfer Protocol (TFTP) firmware download to multiple devices in a network via use of a central configuration distributed via script (Simple Network Management Protocol (SNMP), DHCP, or any command line scripting language), includes: obtaining, by a device (i.e., DHCP), a new configuration containing instructions to look for a new software image including TFTP server IP address and target file name; checking the server for a new software image; and obtaining the new software image from the server.

In another embodiment of the invention, an apparatus for performing automatic Trivial File Transfer Protocol (TFTP) firmware download, includes: a device including a TFTP module; and a target device coupled to the device via a network, the target device including a TFTP module to permit an automatic TFTP protocol to download a software image from the target device to the device, where the device obtains a configuration file with an automatic TFTP statement indicating the Internet Protocol (IP) address of the target device and a file name of a target file with the software image.

In another embodiment of the invention, an apparatus for performing automatic Trivial File Transfer Protocol (TFTP) firmware download for multiple devices in a network, includes: a plurality of devices, each device including a TFTP module; and a target device coupled to the devices via a network, the target device including a TFTP module to permit an automatic TFTP protocol to download a software image from the target device to a first one of the devices, where the first one of the devices obtains a configuration file with an automatic TFTP statement indicating the Internet Protocol (IP) address of the target device and a file name of a target file with the software image, where a second one of the devices is configured to obtain the software image from the first one of the devices.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
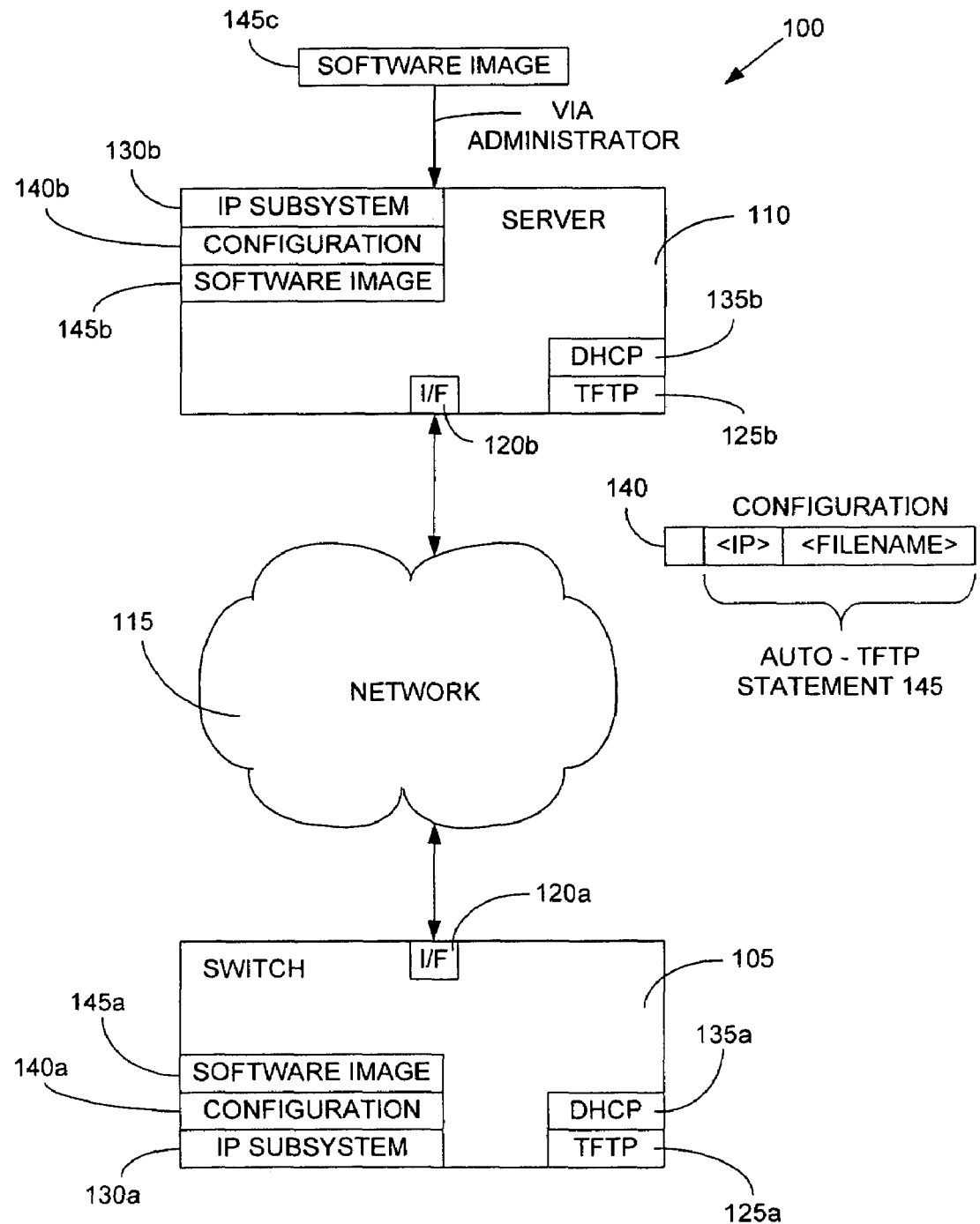
FIG. 1 is a block diagram of an apparatus in accordance with an embodiment of the invention.

FIG. 1 is a block diagram of an apparatus 100 in accordance with an embodiment of the invention. The apparatus 100 includes a switch 105 and a target server 110 coupled to a communications network 115. The network 115 may be, for example, a local area network (LAN) or a wide area network (WAN), or other types of suitable networks that can support the Trivial Transfer File Protocol (TFTP) protocol.

Although a switch is illustrated in FIG. 1, any networked-connected device may be used instead of the switch 105, as long as the device can execute the automatic TFTP protocol. The automatic TFTP protocol permits configuration files and software to be download from the target server 110 to the switch 105. As known to those skilled in the art, TFTP is an Internet protocol used for exchanging files between computers on the Internet. TFTP uses the User Datagram Protocol (UDP), rather than the Transmission Control Protocol (TCP). TFTP is described formally in Request for Comments (RFC) 1350.

In one embodiment, the switch 105 includes an interface 120a (e.g., a port) to permit the switch 105 to communicate via network 115, while the target server 110 includes an interface 120b to permit the server 110 to communicate via network 115. The interfaces 120a and 120b may be, for example, ports and/or other types of interfaces that can handle the IP protocol. The connection between the switch 105 and/or the target server 110 may include a wired link, a wireless link, and/or both wired and wireless links.

In one embodiment, the switch 105 includes a TFTP module 125a and the target server 110 includes a TFTP module 125b, so that both the switch 105 and the target server 110 can handle the automatic TFTP protocol to permit software and configuration download from the target server 110 to the switch 105. Since both the switch 105 and the target server 110 can execute the TFPT protocol, both devices have the requirements of IP. The switch 105 includes an IP subsystem module 130a and the target server 110 includes an IP subsystem module 130b to support the IP protocol.

In one embodiment, the switch 105 includes an optional DHCP module 135a and the target server 110 includes an optional DHCP module 135b, so that both the switch 105 and the target server 110 can handle the DHCP protocol to permit automatic assignment of an IP address to the switch 105. The DHCP protocol is particularly useful if the switch 105 is connected to a large network. Alternatively, the modules 135a and 135b permit both the switch 105 and the target server 110 to handle the BOOTP protocol. It is noted, however, that the DHCP modules are not required in an embodiment of the invention. The switch 105 and the target server 110 can function without the DHCP protocol. In this particular instance, the IP address for the switch 105 will typically be manually entered.

It is noted that the user has the ability to specify, via user interface to the configuration 140a, to seek new firmware from a specified IP address and filename located at that IP address.

A configuration file 140a may be loaded to the switch 105, where a configuration file 140a defines the configuration parameters for use by the switch 105. The switch 105 may download an upgraded software image 145b (from target server 110) to the switch 105 by use of TFTP.

In one embodiment, a configuration file 140 includes an automatic TFTP statement 145 that identifies an IP address <IP> of the target server 110 and a filename <FILENAME> that identifies the target server file with firmware such as operating system 145b. Configuration 140a is the configuration previous to the download of configuration 140b (obtained through DHCP).

Figure 2A:
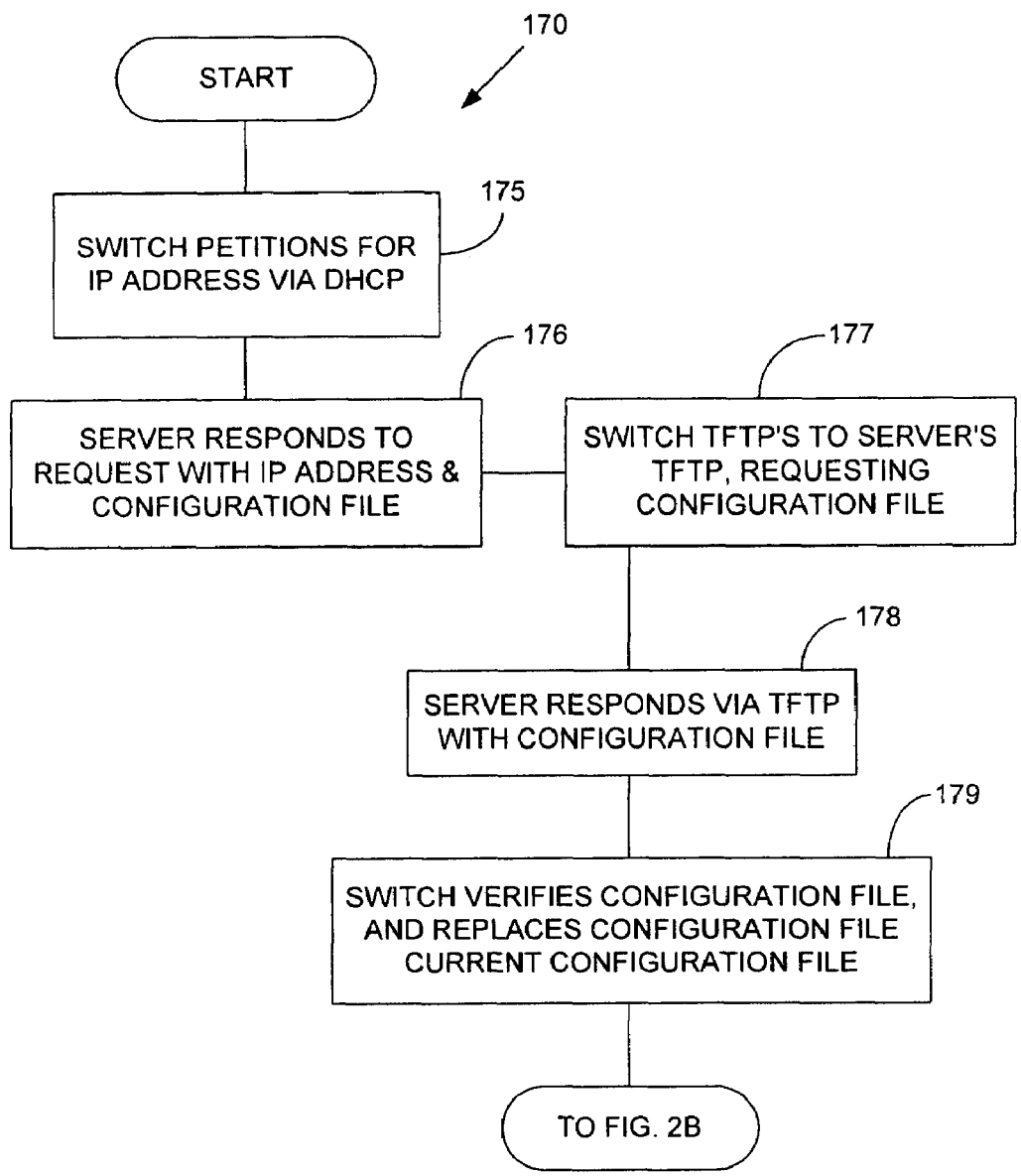
FIGS. 2A through 2C is a flowchart illustrating a method of operation of the apparatus shown in FIG. 1, in accordance with an embodiment of the invention.
Figure 2B:
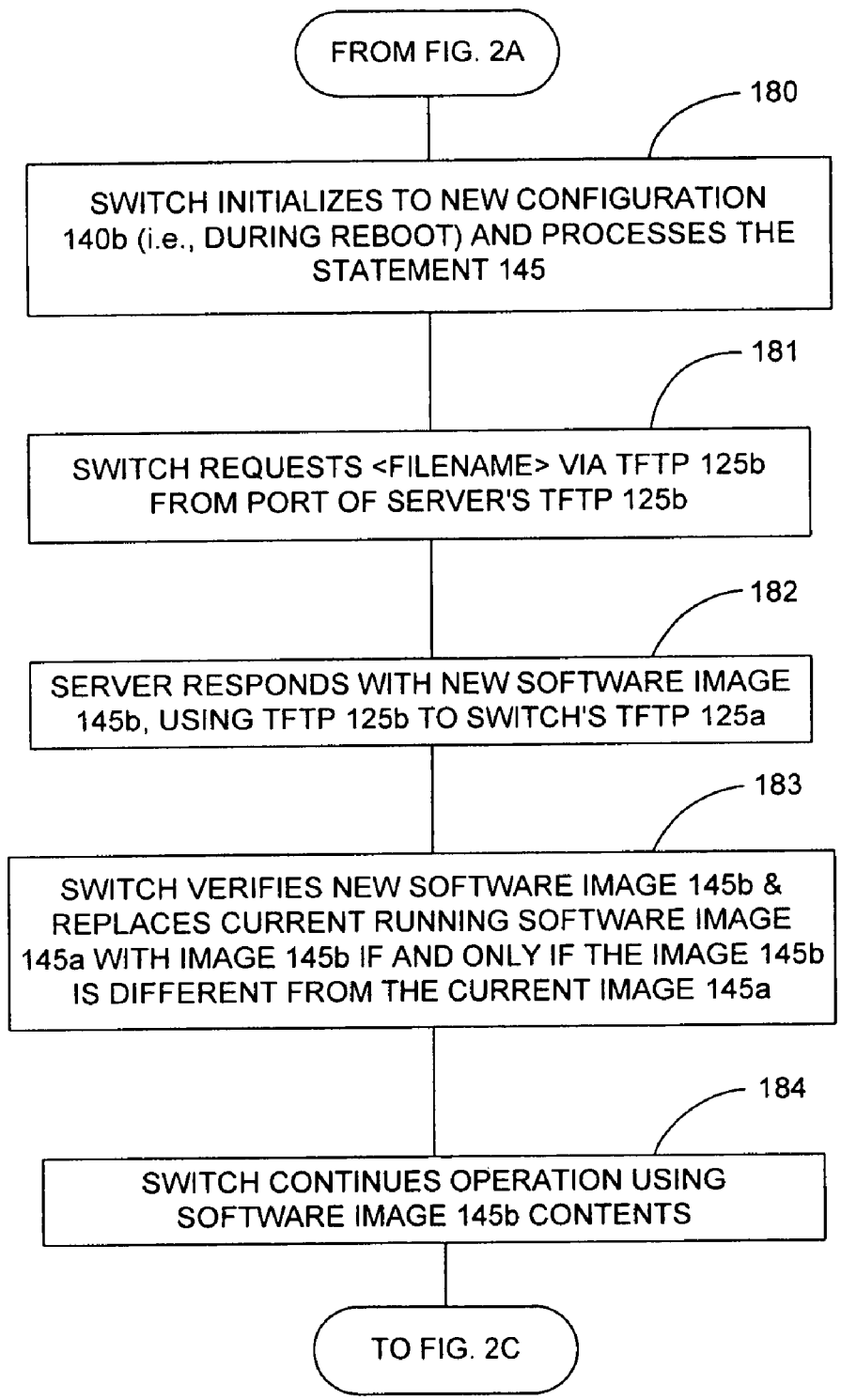
Figure 2C:
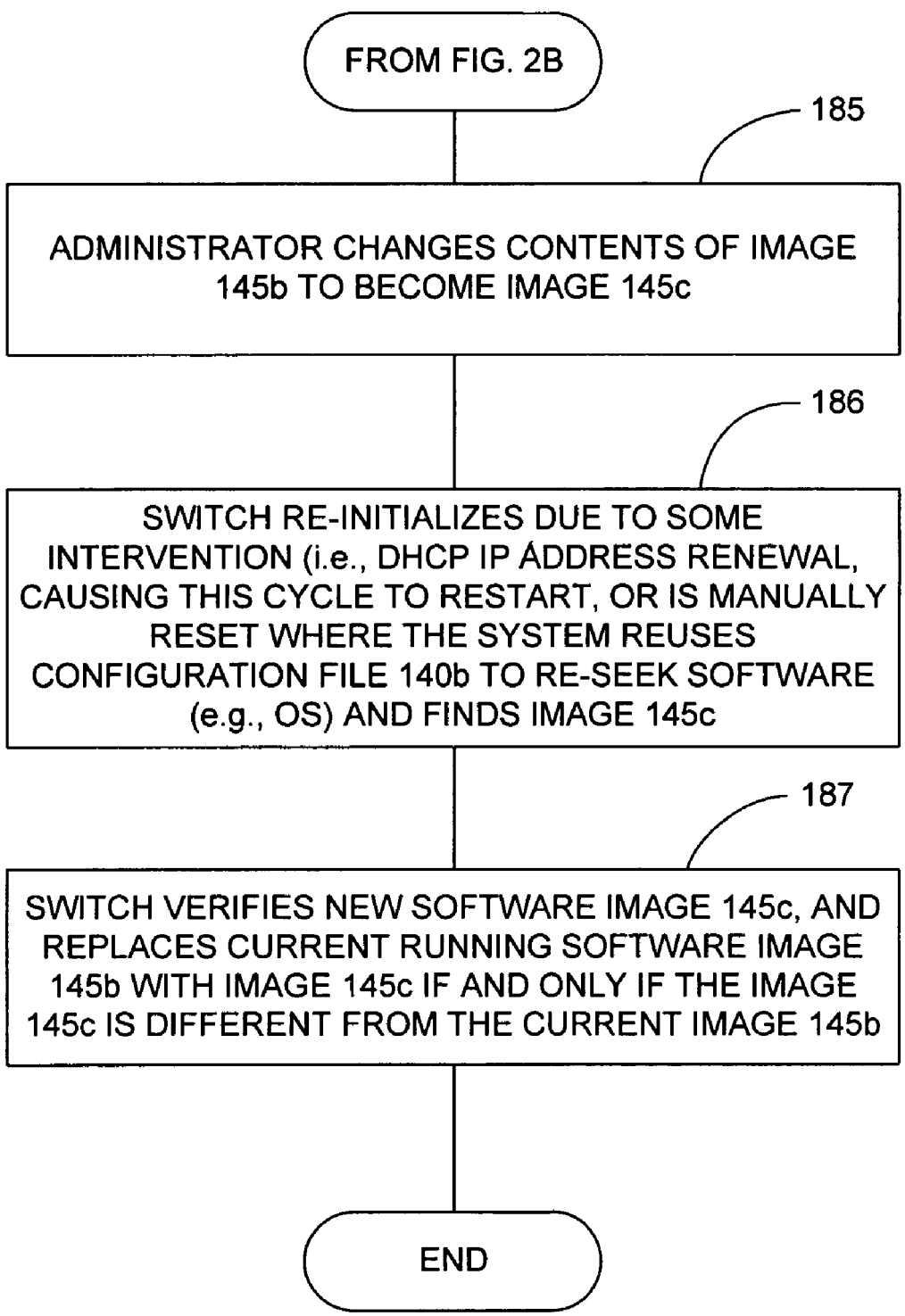

FIGS. 2A through 2c is a flowchart illustrating a method 170 of operation of the apparatus 100 shown in FIG. 1, in accordance with an embodiment of the invention.

(1) DHCP of IP address and configuration file:
   a. Switch 105 petitions (requests) for IP address via DHCP 135b (procedure 175 or action 175).
   b. Server 110 responds to request with IP address and Configuration file 140b (procedure 176).
   c. Switch TFTP's 125a to server's TFTP 125b, requesting configuration file 140b (procedure 177).
   d. Server 110 responds via TFTP 125b with configuration file 140b (procedure 178).
   e. Switch 105 verifies configuration file 140b, and replaces configuration file 140a (procedure 179).

(2) TFTP of new system image:
   f. Switch 105 initializes to new configuration file 140b (i.e., during reboot) and processes statement 145 (procedure 180).
   g. Switch 105 requests <FILENAME> via TFTP 125a from port of server TFTP 125b (procedure 181).
   h. Server 110 responds with software image (e.g., OS file) 145b using TFTP 125b to switch's TFTP 125a (procedure 182).
   i. Switch 105 verifies new software image 145b and replaces current running software image 145a with image 145b if and only if the image 145b is different from the current image 145a (procedure 183).
   j. Switch 105 continues operation using image 145b contents (procedure 184)
   k. Administrator changes contents of software image 145b to become software image 145c (procedure 185).
   l. Switch 105 re-initializes due to some intervention (i.e., DHCP IP address renewal, causing this cycle to restart, or is manually reset where the system reuses configuration file 140b to re-seek software (e.g., OS), and finds image 145c) (procedure 186).
   m. Switch 105 verifies new software image 145c and replaces current running software image 145b with image 145c if and only if the image (e.g., OS image) 145c is different from the current image (e.g., OS image) 145b (procedure 187).

Part (1) above (i.e., procedures for DHCP of IP address and configuration) could be a user interface to configuration or Management Information Block (MIB) 150 issuing a configuration download request similar to the procedures in Part (1) or a user requested configuration download. No matter which they choose, the important element is the entry 145 in the configuration 140 indicating to look for new software image (e.g., OS) 145b at server 110 using TFTP 125b.

The firmware (software image) is what is being downloaded as a result of a configuration 140 indicating the need for download.

A software image 145 (e.g., an operating system and/or other firmware) may be currently loaded in switch 105, while the target server 110 may download an upgraded software image (e.g., operating system or "OS") 145b (and/or other firmware) via TFTP download.

The switch 105 may also have a Management Information Block (MIB) 150 that runs the task for downloading the configuration file 140 from the target server 110 to the switch 105. As known to those skilled in the art, MIB is a formal description of a set of network objects that can be managed by a network management system by use of the Simple Network Management Protocol (SNMP). The format of the MIB is defined as part of the SNMP. The MIB formats allow any SNMP tools to monitor any device defined by a MIB.

After a new switch (or other suitable device) is hooked to a network, the switch would get a new IP address and configuration file. In one embodiment, the IP address is obtained from a target server that can execute the DHCP protocol, where the DHCP protocol permits the automatic sending of the new IP address to the switch. In another embodiment that does not use the DHCP protocol, the new IP address for the switch must typically be manually entered in the switch.

The configuration file 140 will contain an automatic TFTP statement that contains an IP address <IP> of a TFTP target server and the file name <FILENAME> of the file in the target server with the upgraded configuration and/or upgraded firmware and/or software. The software image in the target server may contain an image of, for example, an operating software that can be used by the switch and/or an image of other programs that can be used by the switch. Thus, the configuration file can be used as a mechanism for the switch to invoke the automatic TFTP for downloading firmware or other software from a target device to the switch via a network. A management information block (MIB) may be used to force the download of a configuration file which, in turn, would load automatic TFTP for the switch to invoke.

Figure 3:
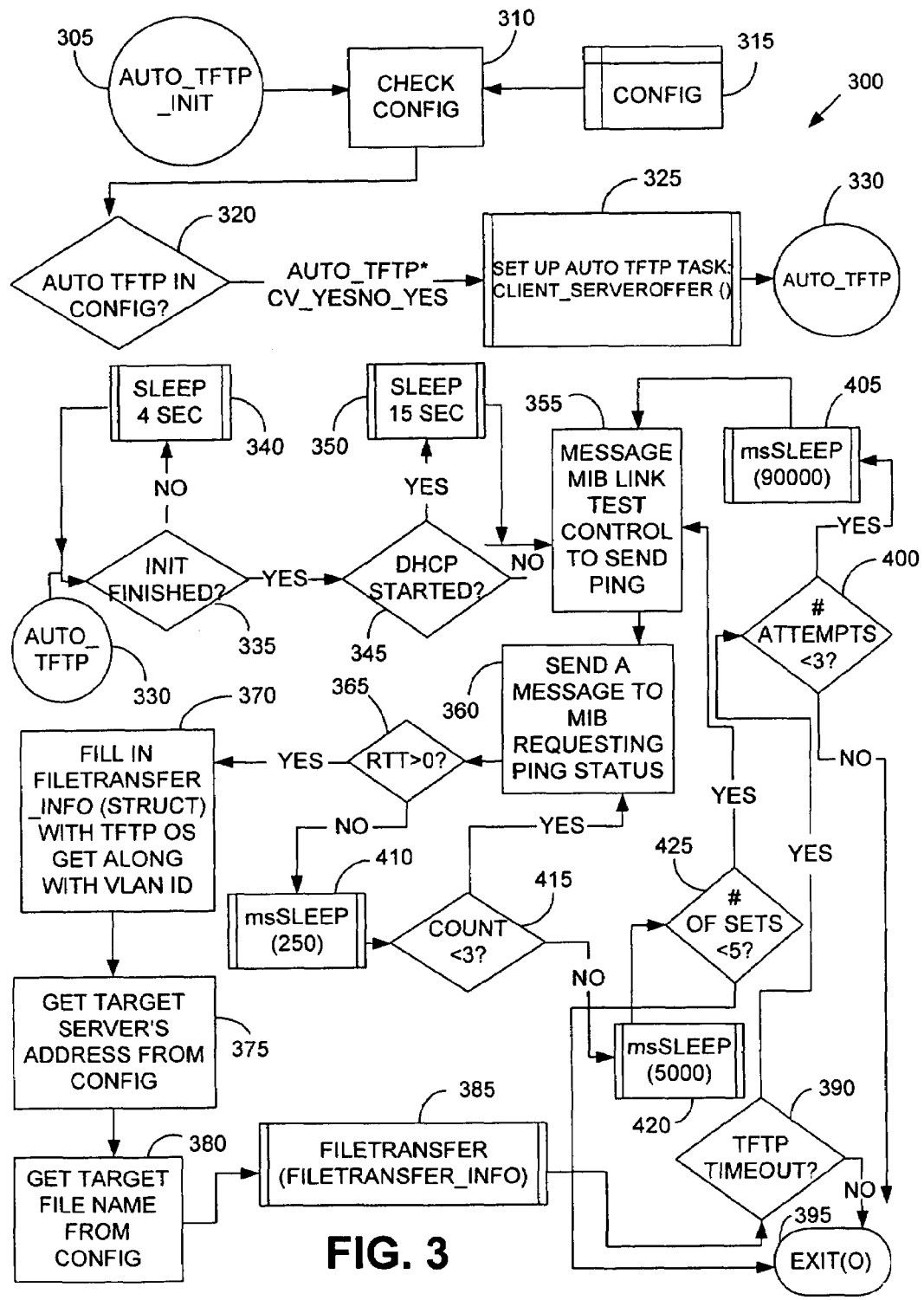
FIG. 3 is a flowchart showing additional details of a method in accordance with an embodiment of the invention.

FIG. 3 is a detailed flow diagram of a method 300 of performing automatic TFTP firmware download, in accordance with an embodiment of the invention. The switch first perform an automatic TFTP initialization routine 305, and checks (310) the configuration 315 in the switch. If the configuration 315 is set up with automatic TFTP, then a thread 325 is created that can manage the automatic TFTP function 330, including callback functions and management of the sleep functions.

The automatic TFTP function 330 first checks (335) if the switched has finished booting. If not, then the automatic TFTP function 330 will be in a sleep state 340 for, e.g., about 4 seconds. Note that the numerical values indicated in FIG. 3 are some of the possible values that may be used in the method 300. Other suitable numerical values may also be used in the method 300. If the switch has finished booting in action (335), then the automatic TFTP function 330 will then check (345) if DHCP (or BOOTP) has started. Note that action (345) is an optional action, since the method 300 does not require the use of DHCP or BOOTP. In other words, the IP address can be entered manually into the switch without the use of DHCP or BOOTP. If DHCP (or BOOTP) has started in action (345), then the automatic TFTP function 330 will be in a sleep state 350 for, e.g., about 15 seconds. If DHCP (or BOOTP) has not started in action (345), then the automatic TFTP function 330 sends (355) a message to the Management Information Block (MIB) for the TFTP firmware download task. In this embodiment, the downloading of the configuration file is facilitated via the MIB. The configuration file will, in turn, load the automatic TFTP. The automatic TFTP function 330 also sends (360) a ping signal to make sure that the target server that is specified in the automatic TFTP statement in the configuration file is responding to messages from the switch. Since the TFTP task is a longer time out period, it is useful to ping the TFTP target server to make sure the target server can communicate with the switch.

The automatic TFTP function 330 then checks (365) if the round trip time (rtf) of the ping signal is greater than zero. If so, then the ping action was successful, and the automatic TFTP function 330 fills in (370) the file transfer information that the switch uses internally to set up the TFTP task. The automatic TFTP function 330 then obtains (375) the address of the target server from the configuration file and obtains (380) the target file name from the configuration file. The automatic TFTP function 330 will then try to call the filetransfer( ) function 385, which is a function provided as an interface to TFTP for purposes of uploading and downloading configuration files and OS images and/or other software. The automatic TFTP function 330 can check (390) for TFTP errors during the attempt to download the OS image from the specified TFTP server. If there are no errors (or the errors are acceptable), then the automatic TFTP function 330 exits (395) and will not resume until the switch is rebooted. If there are unacceptable errors during the check (390), then an attempt will be made (400) at again downloading the OS image from the specified TFTP target server. For example, up to three attempts can be made to download the OS image. If more than three attempts have been made and the download of the OS image was not successful, then the automatic TFTP function 330 will be in a sleep state 405 for, e.g., about 90 seconds, and action 355 repeats so that a message is sent to the MIB to repeat the TFTP firmware download task. The sleep state 405 insures that attempts to repeat the TFTP firmware download task will not yet be performed immediately in case another person is unplugging and plugging the target server or if connectivity is otherwise being broken between the switch and the target server.

If, in action (365), the round trip time (rtf) of the ping is not greater than zero, then the ping action was not successful. The automatic TFTP function 330 will then be in a sleep state 410. If the ping fails, for example, less than approximately 3 times, as checked in action (415), then the automatic TFTP function 330 will be in a sleep state 420 for, e.g., approximately 5 seconds and will try to ping the target server again. If there is failure after 5 sets of 3 pings each, as checked in action (425), then the automatic TFTP function 330 will terminate (395) and will fail to perform a TFTP download of the OS from the target server to the switch.

Figure 4:
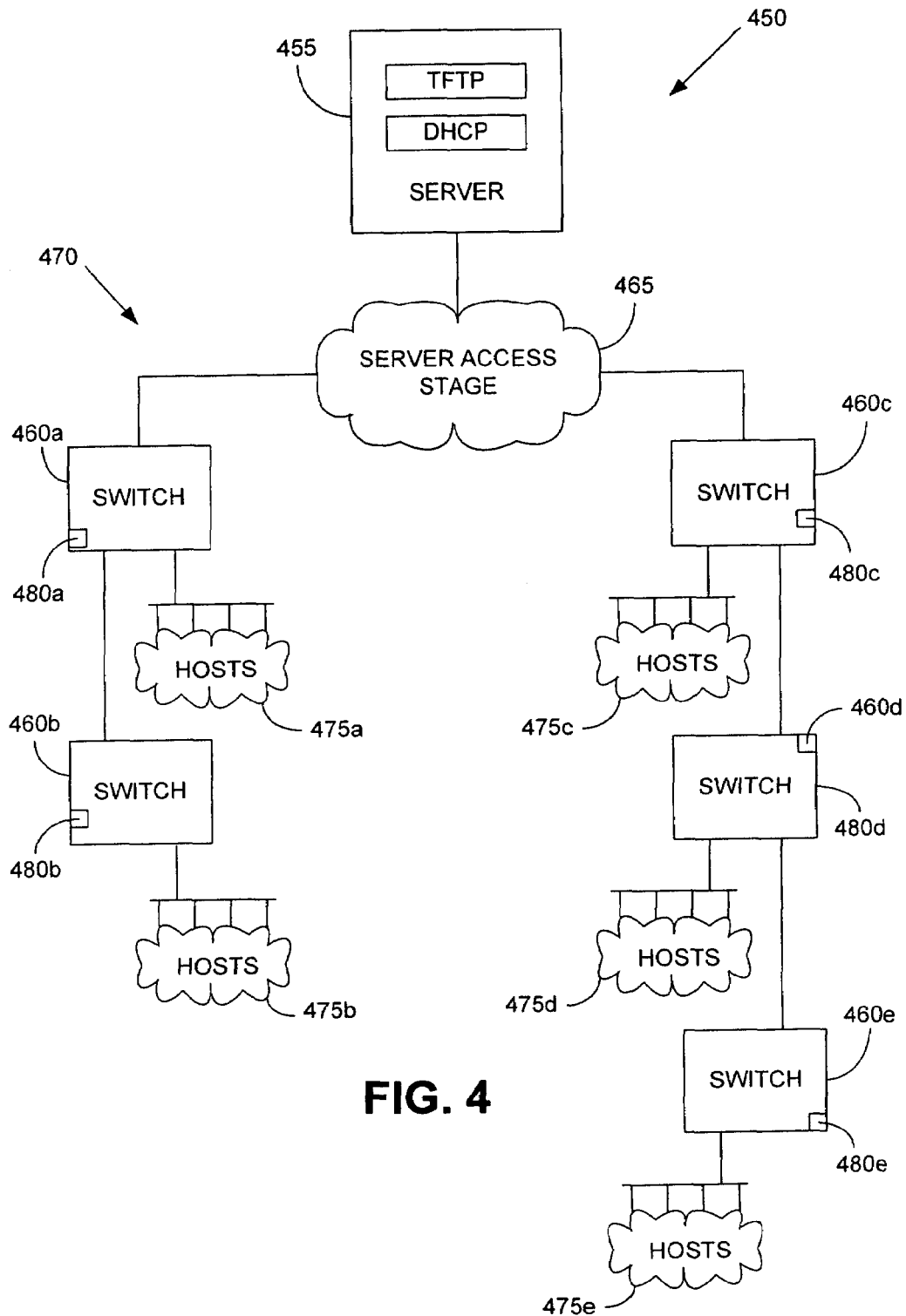
FIG. 4 is a block diagram of an apparatus in accordance with another embodiment of the invention.

FIG. 4 is a block diagram of an apparatus 450 in accordance with another embodiment of the invention. Assume that a target server 455 can run DHCP and TFTP. Assume that switches 460a-460e are of the same type of switch and can run DHCP and TFTP. Each of the switch 460a-460e can access the target server 455 via server access stage 465 in the network 470. The switches 460a-460d may be coupled to hosts 475a-475e, respectively. The number of switches 469 and hosts 475 in FIG. 4 may vary in number.

When a first one of the switches (e.g., switch 460a) obtains an upgraded configuration and/or upgraded firmware (e.g., upgraded OS image or other software image) from the target server 455, then the other switches (e.g., switches 460b-460e) can also obtain the upgraded configuration and/or upgraded firmware. In one embodiment, each one of the other switches (e.g., switches 460a-460e) are manually configured to specify their target IP address <IP> and target file name <FILENAME> for the upgraded configuration and/or upgraded firmware. As an example, the target of the switch 460b may be switch 460a, while the target of the switch 460c may be switch 460b. Thus, the configuration version and OS system version (or version of another software image content) will be homogenous for all the switches 460 in the network 470.

The switches 460a-460e may include the timers 480a-480e, respectively, for timing when a switch will check the other switches for upgraded configuration and/or upgraded firmware.

Figure 5:
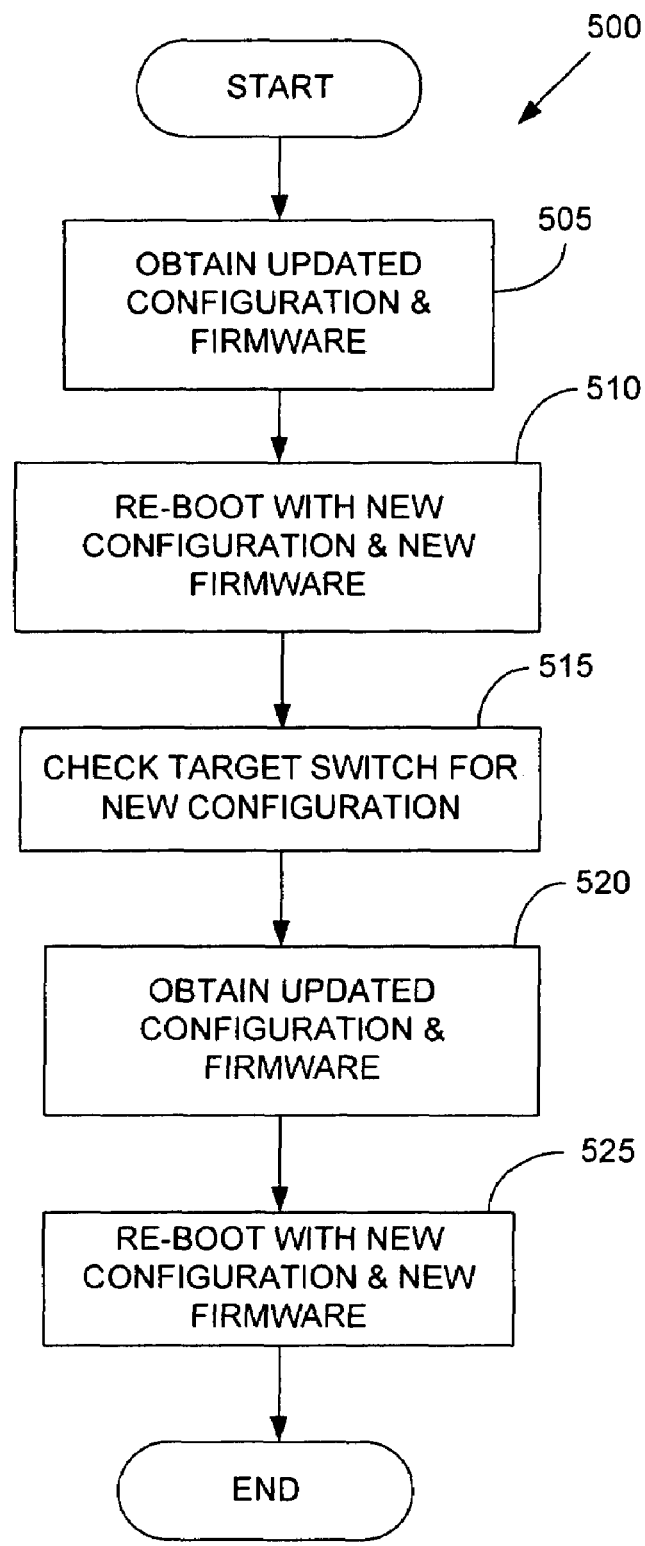
FIG. 5 is a flowchart of a method in accordance with another embodiment of the invention.

FIG. 5 is a flowchart of a method 500 of updating configuration and firmware in devices in a network. This embodiment is a method of using automatic Trivial File Transfer Protocol (TFTP) to download firmware to multiple devices in a network via use of a central configuration distributed via script (Simple Network Management Protocol (SNMP), DHCP, or any command line scripting language). As discussed below, the method may include, obtaining, by a device (i.e., DHCP), a new configuration containing instructions to look for a new software image including TFTP server IP address and target file name; checking the server for a new software image; and obtaining the new software image from the server.

A first device (e.g., switch 460a in FIG. 4) first obtains (505) an upgraded configuration and/or upgraded firmware from a target (e.g., target server 455). The automatic TFTP firmware download method as described with reference to FIGS. 2A-2C or FIG. 3 may be used to download the upgraded configuration and/or upgraded firmware (or other software image) to the first device. The first device then re-boots (510) with the new configuration and/or new firmware (or other software image).

A second device then checks (515) its target device for a new configuration. In the example shown in FIG. 5, the first device is the target device of the second device. The second device obtains (520) the upgraded configuration and/or upgraded firmware (or other software image) from the target device. The automatic TFTP firmware download method as described with reference to FIGS. 2A-2C or FIG. 3 may be used to download the upgraded configuration and/or upgraded firmware (or other software image) from the first device (target device) to the second device. The second device then re-boots (525) with the new configuration and/or new firmware (or other software image). Another device may obtain the upgraded configuration and/or upgraded firmware from the second device if the second device is a specified target device for that other device.

An embodiment of the present invention may be advantageously utilized with any device that can run TFTP and that loads imbedded firmware. Thus, an embodiment of the invention is not limited to the switches described above.

The network described above is also not limited to Ethernet. Other media may be used such as Token Ring, Fibre Channel, Apple Talk, or other media that can handle the IP Protocol.

The various engines discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of performing automatic Trivial File Transfer Protocol (TFTP) firmware download, the method comprising:

sending a request from a device for an internet protocol (IP) address for the device, wherein the device is connected to a network;

in response to the request, sending, from a server to the device, an IP address to be assigned to the device and a configuration file, where the configuration file includes an automatic Trivial File Transfer Protocol (TFTP) statement that contains a target IP address of a target server and a file name of a file in the target server where the file contains an upgraded configuration file or upgraded software;

storing the configuration file into the device;

in response to the automatic TFTP statement in the configuration file, invoking, by the device, a TFTP firmware download function for automatically downloading software images from the target server;

said invoking including an act of sending, by the device to the target server, a request for the file based upon the file name in the configuration file;

in response to the request for the file, sending a new software image of the upgraded configuration file or of the upgraded software from the target server to the device by use of the TFTP firmware download function;

verifying, by the device, if the new software image is different from a current software image in the device; and replacing the current software image in the device with the new software image if the new software image is different from the current software image.

2. The method of claim 1, further comprising:
parsing the downloaded new software image from the file.

3. The method of claim 1, further comprising:
re-booting the device with the downloaded new software image.

4. The method of claim 1 wherein the configuration file is obtained by the device by use of Dynamic Host Configuration Protocol (DHCP).

5. The method of claim 1, wherein the downloaded software image includes an upgraded firmware.

6. The method of claim 1, further comprising:
if there is no match between the new software image from the target file and the current software image currently running in the device, then discontinuing the download of the new software image from the target file.

7. A software image installed in a device that is connected to a network, in accordance with the method of claim 1.

8. The method of claim 1, further comprising:
preventing a download of the new software image from the target server to the device, if ping messages fail after a predetermined number of transmissions.

9. The method of claim 1, further comprising:
repeating a download of the new software image if an error occurs using downloading of the new software image.

10. The method of claim 5, wherein the upgraded firmware includes an upgraded operating software.

11. The method of claim 8 wherein the predetermined number of transmissions comprises a plurality of sets of ping messages where each set is separated by a sleep state.

12. The method of claim 9, further comprising:
preventing a download of the new software image from the target server to the device, if download attempts of the new software image fail after a predetermined number of download attempts.

13. The method of claim 9, wherein a download of the new software image from the target server to the device is prevented, if download attempts of the new software image fail after a predetermined number of download attempts.

14. An article of manufacture, comprising:
a machine-readable medium having stored thereon instructions to:

send a request from a device for an internet protocol (IP) address for the device, wherein the device is connected to a network;

in response to the request, send, from a server to the device, an IP address to be assigned to the device and a configuration file; where the configuration file includes an automatic Trivial File Transfer Protocol (TFTP) statement that contains a target IP address of a target server and a file name of a file in the target server where the file contains an upgraded configuration file or upgraded software;

store the configuration file into the device;

invoke, by the device in response to the automatic TFTP statement in the configuration file, a TFTP firmware download function for automatically downloading software images from the target server, including an act of sending, by the device to the target server, a request for the file based upon the file name in the configuration file;

in response to the request for the file, send a new software image of the upgraded configuration file or of the upgraded software from the target server to the device by use of the TFTP firmware download function;

verify, by the device, if the new software image is different from a current software image in the device; and replace the current software image in the device with the new software image if the new software image is different from the current software image.

15. The article of manufacture of claim 14, wherein the instructions prevent a download of the new software image from the target server to the device, if ping messages fail after a predetermined number of transmissions.

16. The article of manufacture of claim 15, wherein the predetermined number of transmissions comprises a plurality of sets of ping messages where each set is separated by a sleep state.

17. An apparatus for performing automatic Trivial File Transfer Protocol (TFTP) firmware download, the apparatus comprising:

a device including means for sending a request for an internet protocol (IP) address for the device, wherein the device is connected to a network;

a server including means for sending an IP address to be assigned to the device and a configuration file, where the configuration file includes an automatic Trivial File Transfer Protocol (TFTP) statement that contains a target IP address of a target server and a file name of a file in the target server where the file contains an upgraded configuration file or upgraded software, in response to the request, where the server and target server are connected to the network;

wherein the device includes means for storing the configuration file into the device and means for invoking, in response to the automatic TFTP statement in the configuration file, a TFTP firmware download function for automatically downloading software images from the target server;

said means for invoking including means for sending, by the device to the target server, a request for the file based upon the file name in the configuration file;

wherein the target server includes means for sending a new software image of the upgraded configuration file or of the upgraded software from the target server to the device by use of the TFTP firmware download function, in response to the request for the file;

wherein the device includes means for verifying if the new software image is different from a current software image in the device; and wherein the device includes means for replacing the current software image in the device with the new software image if the new software image is different from the current software image.

18. The apparatus of claim 17, further comprising: means for preventing a download of the new software image from the target server to the device, if ping messages fail after a predetermined number of transmissions.

19. The apparatus of claim 18, wherein the predetermined number of transmissions comprises a plurality of sets of ping messages where each set is separated by a sleep state.

20. A method of performing automatic Trivial File Transfer Protocol (TFTP) firmware download to multiple devices in a network via use of a central configuration distributed via script (Simple Networked Management Protocol, Dynamic Host Configuration Protocol (DHCP), or any command line scripting language), the method comprising:
- sending a request from a device for an internet protocol (IP) address for the device, wherein the device is connected to a network;
- in response to the request, sending, from a server to the device, an IP address to be assigned to the device and a configuration file, where the configuration file includes an automatic Trivial File Transfer Protocol (TFTP) statement that contains a target IP address of a target server and a file name of a file in the target server where the file contains an upgraded configuration file or upgraded software;
- storing the configuration file into the device;
- in response to the automatic TFTP statement in the configuration file, invoking, by the device, a TFTP firmware download function for automatically downloading software images from the target server;
- said invoking including an act of sending, by the device to the target server, a request for the file based upon the file name in the configuration file;
- in response to the request for the file, sending a new software image of the upgraded configuration file or of the upgraded software from the target server to the device by use of the TFTP firmware download function;
- verifying, by the device, if the new software image is different from a current software image in the device;
- replacing the current software image in the device with the new software image if the new software image is different from the current software image;
- sending the new software image to a second device; and
- replacing a second current software image in the second device with the new software image if the new software image is different from the second current software image.

21. The method of claim 20, further comprising:
parsing the downloaded new software image.

22. The method of claim 20, further comprising:
re-booting the device with the new software image.

23. The method of claim 20, wherein the new software image includes an upgraded firmware.

24. The method of claim 23, wherein the upgraded firmware includes an upgraded operating software.

25. A software image installed in a device that is connected to a network, in accordance with the method of claim 20.

26. The method of claim 20, further comprising: preventing a download of the new software image from the target server to the device, if ping messages fail after a predetermined number of transmissions.

27. The method of claim 26, wherein the predetermined number of transmissions comprises a plurality of sets of ping messages where each set is separated by a sleep state.

28. An article of manufacture, comprising:
a machine-readable medium having stored thereon instructions to:
- send a request from a device for an internet protocol (IP) address for the device, wherein the device is connected to a network;
- send, from a server to the device, an IP address to be assigned to the device and a configuration file, where the configuration file includes an automatic Trivial File Transfer Protocol (TFTP) statement that contains a target IP address of a target server and a file name of a file in the target server where the file contains an upgraded configuration file or upgraded software;
- store the configuration file into the device;
- invoke, by the device in response to the automatic TFTP statement in the configuration file, a TFTP firmware download function for automatically downloading software images from the target server, including an act of sending, by the device to the target server, a request for the file based upon the file name in the configuration file;
- send a new software image of the upgraded configuration file or of the upgraded software from the target server to the device by use of the TFTP firmware download function, in response to the request for the file;
- verify, by the device, if the new software image is different from a current software image in the device;
- replace the current software image in the device with the new software image if the new software image is different from the current software image;
- send the new software image to a second device; and
- replace a second current software image in the second device with the new software image if the new software image is different from the second current software image.

29. The article of manufacture of claim 28, wherein the instructions prevent a download of the new software image from the target server to the device, if ping messages fail after a predetermined number of transmissions.

30. The article of manufacture of claim 29, wherein the predetermined number of transmissions comprises a plurality of sets of ping messages where each set is separated by a sleep state.

31. An apparatus for performing automatic Trivial File Transfer Protocol (TFTP) firmware download to multiple devices in a network via use of a central configuration distributed via script (Simple Networked Management Protocol, Dynamic Host Configuration Protocol (DHCP), or any command line scripting language), the apparatus comprising:
- a device including means for sending a request an internet protocol (IP) address for the device, wherein the device is connected to a network;
- means for sending, from a server to the device, an IP address to be assigned to the device and a configuration file, where the configuration file includes an automatic Trivial File Transfer Protocol (TFTP) statement that contains a target IP address of a target server and a file name of a file in the target server where the file contains an upgraded configuration file or upgraded software, in response to the request, wherein the server and target server are connected to the network;
- wherein the device includes means for storing the configuration file into the device;
- wherein the device includes means for sending, to the target server, a request for the file based upon the file name in the configuration file;
- wherein the device includes means for invoking, in response to the automatic TFTP statement in the configuration file, a TFTP firmware download function for automatically downloading software images from the target server;
said means for invoking including means for sending a new software image of the upgraded configuration file or of the upgraded software from the target server to the device by use of the TFTP firmware download function, in response to the request for the file;
wherein the device includes means for verifying if the new software image is different from a current software image in the device;
wherein the device includes means for replacing the current software image in the device with the new software image if the new software image is different from the current software image;
wherein the device includes means for sending the new software image to a second device that is connected to the network; and
wherein the second device includes means for replacing a second current software image in the second device with the new software image if the new software image is different from the second current software image.

32. The apparatus of claim 31, further comprising: means for preventing a download of the new software image from the target server to the device, if ping messages fail after a predetermined number of transmissions.

33. The apparatus of claim 32, wherein the predetermined number of transmissions comprises a plurality of sets of ping messages where each set is separated by a sleep state.

34. An apparatus for performing automatic Trivial File Transfer Protocol (TFTP) firmware download, the apparatus comprising:
a device including a TFTP module; and
a target server coupled to the device via a network, the target server including a TFTP module to permit an automatic TFTP protocol to download a software image from the target server to the device, wherein:
the device sends a request for an internet protocol (IP) address for the device;
in response to the request, the device receives an IP address to be assigned to the device and a configuration file, where the configuration file includes an automatic Trivial File Transfer Protocol (TFTP) statement that contains a target IP address of a target server and a file name of a file in the target server where the file contains an upgraded configuration file or upgraded software;
the device stores the configuration file;
in response to the automatic TFTP statement in the configuration file, the device invokes a TFTP firmware download function for automatically downloading software images from the target server, wherein the device sends, to the target server, a request for the file based upon the file name in the configuration file;
in response to the request for the file, the target server sends a new software image of the upgraded configuration file or of the upgraded software to the device by use of the TFTP firmware download function;
the device verifies if the new software image is different from a current software image in the device; and
the device replaces the current software image in the device with the new software image if the new software image is different from the current software image.

35. The apparatus of claim 34, wherein the device is configured to parse the downloaded new software image of the target file.

36. The apparatus of claim 34, wherein the device is configured to reboot with the downloaded new software image.

37. The apparatus of claim 34, wherein the downloaded software image includes an upgraded firmware.

38. The apparatus of claim 34, wherein the device is configured to send a ping message to the target server to determine if the target server can communicate with the device.

39. The apparatus of claim 34, wherein a download of the new software image from the target server to the device is prevented, if download attempts of the new software image fail after a predetermined number of download attempts.

40. The apparatus of claim 34, wherein a download of the new software image is repeated, if an error occurs using downloading of the new software image.

41. The apparatus of claim 34, wherein the device prevents a download of the new software image from the target server to the device, if ping messages fail after a predetermined number of transmissions.

42. The apparatus of claim 37, wherein the upgraded firmware includes an upgraded operating software.

43. The apparatus of claim 38, wherein
if the ping message has a round trip time that is not greater than zero, then the device resends the ping message after a first sleep state has expired.

44. The apparatus of claim 41, wherein the predetermined number of transmissions comprises a plurality of sets of ping messages where each set is separated by a sleep state.

45. An apparatus for performing automatic Trivial File Transfer Protocol (TFTP) firmware download for multiple devices in a network, the apparatus comprising:
a plurality of devices, each device including a TFTP module; and
a target server coupled to the devices via a network, the target server including a TFTP module to permit an automatic TFTP protocol to download a configuration file from the target server to a first one of the devices, wherein:
the device sends a request for an internet protocol (IP) address for the device;
in response to the request, the device receives an IP address to be assigned to the device and a configuration file, where the configuration file includes an automatic Trivial File Transfer Protocol (TFTP) statement that contains a target IP address of a target server and a file name of a file in the target server where the file contains an upgraded configuration file or upgraded software;
the device stores the configuration file;
in response to the automatic TFTP statement in the configuration file, the device invokes a TFTP firmware download function for automatically downloading software images from the target server, wherein the device sends, to the target server, a request for the file based upon the file name in the configuration file;
in response to the request for the file, the target server sends a new software image of the upgraded configuration file or of the upgraded software to the device by use of the TFTP firmware download function;
the device verifies if the new software image is different from a current software image in the device;
the device replaces the current software image in the device with the new software image if the new software image is different from the current software image;
the device sends the new software image to a second device among the plurality of devices; and the second device replaces a second current software image in the second device with the new software image if the new software image is different from the second current software image.

46. The apparatus of claim 45, wherein the first one of the devices is configured to parse the downloaded configuration from the target file.

47. The apparatus of claim 45, wherein the first one of the devices is configured to reboot with the downloaded configuration.

48. The apparatus of claim 45, wherein the downloaded software image includes an upgraded firmware.

49. The method of claim 1, further comprising:
sending a ping message to the target server to determine if the target server can communicate with the device.

50. The apparatus of claim 45, wherein the device prevents a download of the new software image from the target server to the device, if ping messages fail after a predetermined number of transmissions.

51. The apparatus of claim 48, wherein the upgraded firmware includes an upgraded operating software.

52. The method of claim 49, further comprising:
if the ping message has a round trip time that is not greater than zero, then resending the ping message after a first sleep state has expired.

53. The apparatus of claim 50, wherein the predetermined number of transmissions comprises a plurality of sets of ping messages where each set is separated by a sleep state.

* * * * *

UNITED STATES PATENT AND TRADEMARK OFFICE
CERTIFICATE OF CORRECTION

PATENT NO. : 7,346,672 B2 Page 1 of 1
APPLICATION NO. : 10/098941
DATED : March 18, 2008
INVENTOR(S) : Arthur Edwin Harvey, IV It is certified that error appears in the above-identified patent and that said Letters Patent is hereby corrected as shown below:

In column 9, line 65, in Claim 14, after "file" delete ";" and insert -- , --, therefor.

Signed and Sealed this

Twenty-second Day of July, 2008

JON W. DUDAS
*Director of the United States Patent and Trademark Office*